United States Patent [19]

Montross

[11] 4,320,468
[45] Mar. 16, 1982

[54] METHOD FOR TESTING A SEISMIC MARINE CABLE

[75] Inventor: Edwin A. Montross, Houston, Tex.

[73] Assignee: Western Geophysical Co. of America, Houston, Tex.

[21] Appl. No.: 198,079

[22] Filed: Oct. 17, 1980

[51] Int. Cl.³ .............................................. H04R 29/00
[52] U.S. Cl. ..................................... 367/13; 73/1 DV
[58] Field of Search ......................... 367/13; 73/1 DV

[56] References Cited

U.S. PATENT DOCUMENTS

| | | | |
|---|---|---|---|
| 2,917,706 | 12/1959 | Thompson | 367/13 |
| 3,224,246 | 12/1965 | Schloss et al. | 73/1 DV |
| 3,858,169 | 12/1974 | Bardeen | 367/13 |
| 3,930,216 | 12/1975 | Hall, Jr. | 367/13 |
| 4,003,018 | 1/1977 | McCormick | 367/13 |
| 4,043,175 | 8/1977 | Fredriksson | 73/1 DV |
| 4,090,169 | 5/1978 | Adair et al. | 367/13 |
| 4,092,629 | 5/1978 | Siems et al. | 367/15 |
| 4,160,228 | 7/1979 | Hix et al. | 367/13 |
| 4,236,401 | 12/1980 | Bakewell, Jr. et al. | 73/1 DV |

Primary Examiner—Richard A. Farley
Attorney, Agent, or Firm—William A. Knox

[57] ABSTRACT

A method for testing hydrophones in situ by means of a pulser for applying a repeatable low-level pressure pulse to individual hydrophones mounted in a marine seismic streamer cable. The transient output signal, due to the applied pressure pulse, from any one hydrophone under test is compared with the transient signals from other hydrophones under test to determine uniformity of response with respect to signal polarity, amplitude and period (reciprocal frequency).

5 Claims, 5 Drawing Figures

METHOD FOR TESTING A SEISMIC MARINE CABLE

BACKGROUND OF THE INVENTION

1. Field of the Invention

This invention finds application in the testing of individual hydrophones mounted inside seismic streamer cables.

2. Discussion of the Prior Art

Marine seismic streamer-cable sections, used in oceanographic studies and marine geophysical exploration consist of a cylindrical plastic jacket wherein are contained a plurality of hydrophones. Such sections are commonly 100–200 feet long. The cable sections are filled with a light-weight insulating fluid such as odorless kerosene to render the sections neutrally bouyant and are then sealed against oil leakage. The sections further include stress members and electrical conductors for transmission of hydrophone signals. A complete seismic streamer cable is made up of a large number of individual sections that are mechanically and electrically connected together.

In use, a streamer cable is towed behind a ship through the water along an assigned line of survey. Seismic signals propagate through the water as pressure waves. Impinging on the streamer-cable jacket, the pressure waves are transferred to the hydrophones, the light-weight fluid serving as a transmission medium.

There may be 25 to 40 hydrophones within each sealed cable section. The hydrophones are usually electrically connected in parallel to form one or a number of groups of hydrophones, each group constituting a separate data channel. Series-parallel connections are also known. Signals from the individual data channels are transmitted to a signal utilization device by the previously-mentioned electrical conductors.

The hydrophone spacing depends on the length of the cable section as well as the number of hydrophones contained therein. Spacings may range from one to several feet. The hydrophones within any one section may be connected in parallel to a dedicated pair of conductors to form a single group or data channel. In other configurations, the hydrophone may be connected as two or more separate groups, or hydrophones from adjacent cable sections may be included as single group. See for example, U.S. Pat. Nos. 3,133,262, 3,436,722, 3,441,902 and 4,092,629, all assigned to the assignee of this invention and which are incorporated herein by reference as a showing of various known cable configurations.

In order to make meaningful, quantitative comparisons of the signals from each group, it is essential that the electrical responses of the respective groups, as well as the responses of the individual hydrophones, be uniform throughout the length of the streamer cable. It is evident that a dead or shorted-out hydrophone in a particular group will adversely affect the electrical response of that group.

As discussed above, the hydrophones are sealed inside an oil-fitted jacket. Accordingly, it is not practicable in the field to remove the hydrophones from the jacket to physically check each individual hydrophone quantitatively. It is desirable to test each hydrophone in situ. It has long been known to manually tap the outside of streamer cable jacket in the vicinity of a hydrophone by means of the handle of a screwdriver or like tool. The applied blow generates a positive pressure pulse that excites the hydrophone to be tested and, unfortunately, usually to a lesser extent, one or more adjacent hydrophones. The resulting hydrophone output pulse qualitatively indicates that the hydrophone is alive or dead and indicates the signal polarity thereof. Since a manually-applied tap is never uniform from hydrophone to hydrophone, that method is too crude to quantitatively compare important hydrophone response characteristics such as relative sensitivity and natural frequency.

In another method of in-situ testing, an electrical square wave of indefinite period is applied to each group as a whole. The resulting output transient represents the response of an entire group but nothing is learned about the responses of the separate hydrophones that make up the group.

In yet another test procedure the entire cable section is placed in a sealed test tank. The section is then subjected to fluctuating pressures of a pulsating air column, the pulsation frequency being varied over a desired range. But again, the resulting output signal represents the combined response of the entire group.

SUMMARY OF THE INVENTION

It is an object of this invention to provide a hydrophone test set that will apply a small, known, repeatable pressure pulse to a single hydrophone in situ.

In accordance with a preferred embodiment of this invention, I provide a solenoid-actuated plunger that is mounted on a base plate for positioning over the outside of a cable-section jacket, directly opposite an internally-mounted hydrophone. The plunger includes a mallet for impacting the jacket. The base plate supports the plunger and mallet a fixed distance above the jacket. A charged capacitor is discharged across the solenoid coil, causing the mallet on the end of the plunger to impact the streamer-cable jacket. The impact of the mallet generates a pressure pulse that is transmitted through the light-weight fluid to the hydrophone under test. The thus-activated hydrophone generates an electrical output transient response signal. The electrical output transient response of any one activated hydrophone is compared to the responses of all of the other hydrophones to determine uniformity of polarity, sensitivity and frequency among the hydrophones. The mechanical output of the plunger is repeatable because the plunger always travels the same distance before impacting the cable jacket and because the energy discharged from the capacitor is a constant.

In accordance with an aspect of this invention, the mechanical output of the plunger is small with respect to the output of a seismic source.

In accordance with another aspect of this invention, the mallet is composed of an inelastic material to prevent the plunger from bouncing after the initial impact.

BRIEF DESCRIPTION OF THE DRAWINGS

A better understanding of this invention may be had by reference to the appended description and the drawings wherein.

DETAILED DESCRIPTION OF THE PREFERRED EMBODIMENT

Figure 1:
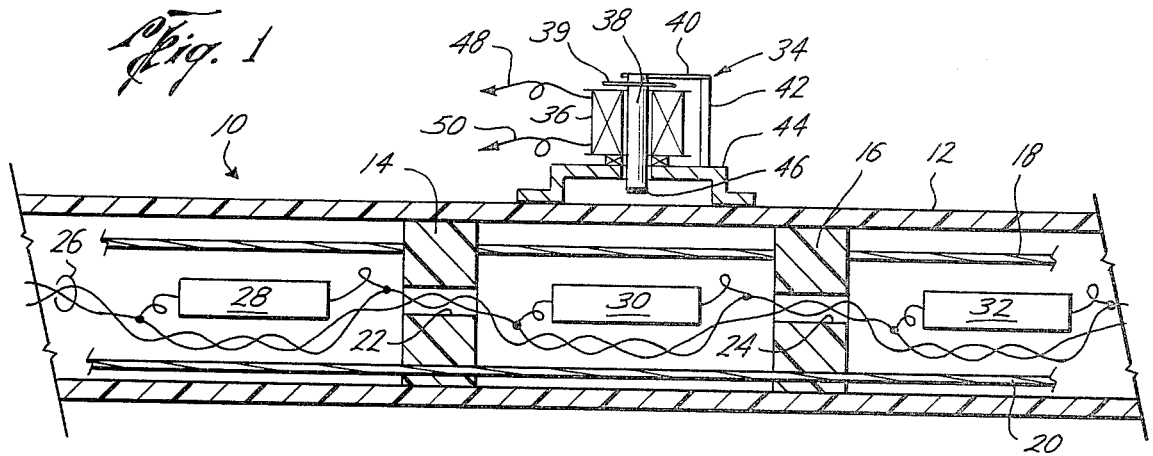
FIG. 1 is a cross section of a part of a streamer cable section upon which is mounted the hydrophone tester of this invention.

Referring now to FIG. 1, there is shown in cross section a portion of a marine streamer cable section. The cable section 10 consists of an outer cylindrical plastic jacket 12, inside of which are mounted a plurality of spacers such as 14, 16. The spacers are mounted a foot or two apart and prevent jacket 12 from collapsing when subjected to ambient water pressure. Spacers 14 and 16 include perforations for receiving stress members such as 18, 20 as well as a bore such as 22 and 24 to allow passage of electrical conductors 26. Only one twisted pair of conductors is shown but several hundred may be used in practice. Hydrophones 28, 30, 32 are mounted inside jacket 12 by any convenient means. Three are shown but twenty-five to forty or more such hydrophones may be mounted in a single 200-foot cable section.

As discussed previously, cable section 10 is filled with a light-weight insulating fluid such as deodorized kerosene. The fluid provides a medium for transmitting pressure pulses from the outside world to the hydrophones.

Hydrophone tester 34 consists of a solenoid 36 having a plunger 38 and a soft iron armature 39, suspended from a spring 40 that is mounted on a support 42. The assembly is mounted on a base plate 44 for firmly contacting jacket 12 of cable section 10. Spring 40 holds plunger 38 a fraction of an inch above jacket 12 when the plunger is at rest.

Plunger 38 is tipped with a mechanically dead or inelastic material such as a low-durometer rubber foam to form a mallet 46 at the lower end. The inelasticity of the mallet prevents plunger 38 from bouncing after its initial impact against jacket 12.

Figure 2:
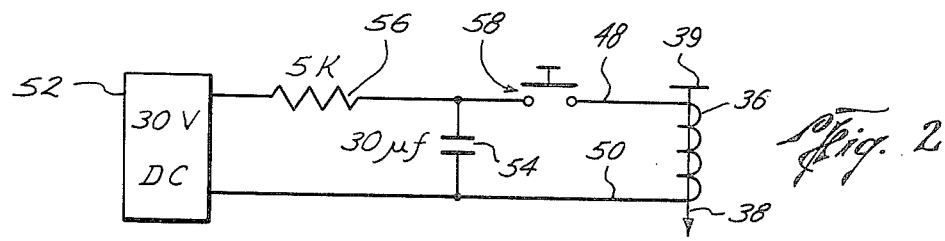
FIG. 2 is a schematic diagram of a power supply and triggering circuit for firing the tester.

Referring now to FIGS. 1 and 2, a source of power such as a 30-volt DC source 52, is connected across a capacitor 54 through a resistor 56. Typical values for the components are 30 μF and 5000 Ohms respectively. Solenoid 36 is connected by leads 48 and 50 across capacitor 54 through a push-button switch 58. In use, tester 34 is placed on jacket 12, directly above a selected hydrophone such as 30. To fire the tester, switch 58 is closed, discharging capacitor 54 into solenoid 36. The surge of current drives armature 39 and plunger 38 downwards to impact cable jacket 12, delivering a pressure pulse to hydrophone 30 through the internally-contained fluid. Capacitor 54 is of course, recharged between successive actuations of switch 58.

Figure 3:
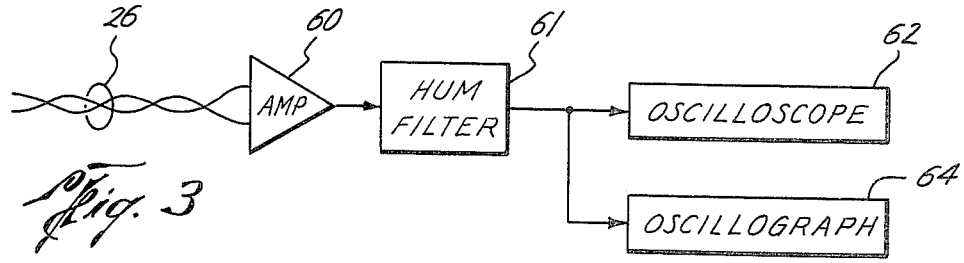
FIG. 3 is a schematic diagram of the signal display.
Figure 4:
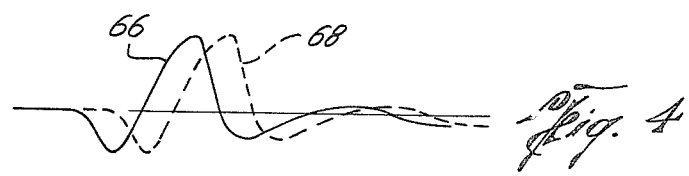
FIG. 4 is a showing of the comparative transient signals generated by two hydrophones in response to pressure pulses created by the hydrophone tester.

Referring now to FIGS. 1 and 3, hydrophones 28, 30, 32 are connected in parallel to conductor pair 26. Conductor pair 26 is coupled to an amplifier 60, which may have a variable gain, the output of which is passed through a filter 61 to remove power line hum. Filter 61 is a low-pass filter having an upper cut-off frequency of about 400 Hz, and a notch characteristic at 60 Hz to reject power line hum. The amplified, filtered output signal of hydrophone 30, generated by the impact of plunger 38, is displayed on an oscilloscope 62 or oscillorgaphic camera 64. FIG. 4 illustrates a typical wave form 66 that results from actuation of plunger 38.

The impulse delivered by the plunger is low-level. That is, the impulse is small relative to the peak pressure pulse that is delivered by an acoustic energy source. The pressure developed in the light-weight fluid by the plunger impact is on the order of 10 millibars or about 0.01 atmosphere. On the othe hand, the peak pressure developed in the water by 0.5 lb of TNT, at a distance of about 50 feet is a few atmospheres.

It is an essential feature of this invention that the pressure pulse delivered by the tester be low-level and that it be repeatable. The pressure pulse must be low-level to minimize generation of mechanical resonances within jacket 12 that might distort the output wave form 66. Mechanical resonances may result from spurious reflections from spacers, stress members, conductors and the like. An equally important reson for keeping the amplitude of the pulse small is to avoid mechanical non-linearities such as anisoelasticity, non-linear compressibility effects, etc., since they would affect the repeatability of the excitation pulse as seen by the hydrophone. In that respect, it is important that tester 34 contacts the cable jacket in the immediate vicinity of the hydrophone under test and in a position around the circumference of the jacket where it can "see" the hydrophone without intervening obstructions. The term "in the immediate vicinity" means that the plunger 38 of tester 34 is positioned on the outside of the cable jacket directly over the center of the hydrophone with no intervening obstructions such as electrical conductors, stress members or the like.

The applied pressure pulse must be low-level also so that only the hydrophone under test receives a pulse. Adjacent hydrophones must remain unaffected.

The applied pressure pulse must be repeatable. A purpose of the tester is to insure that all of the hydrophones of a given group, and indeed also those of adjacent groups demonstrate uniform response characteristics relative to one another. Accordingly, repeatability of the applied pressure pulse is essential. Repeatability is insured by holding constant the stroke of plunger 38 and by allowing sufficient time between consecutive firings so that capacitor 54 becomes fully charged. About one second between firings is adequate.

In use as above described, tester 34 is positioned on the cable jacket in the immediate vicinity of a first hydrophone as shown in FIG. 1 and is fired. The resulting output signal such as 66, FIG. 4 from the hydrophone group is preferably displayed on an oscilloscope 62 having a long retention screen as before stated. The tester 34 is then moved to the immediate vicinity of a second hydrophone such as 32 and is again fired. The output signal 68 from the second hydrophone is displayed for comparison with the first signal 66. The two wave forms should match exactly as to polarity, sensitivity (amplitude) and period (reciprocal frequency). Although wave form 68 is shown displaced from waveform 66 for clarity of illustration, they would normally be superimposed one on the other so that a departure from uniformity will be unmistakable. Alternatively, in parallel the wave forms may be recorded on any suitable medium. Having tested the second hydrophone, the third and all remaining hydrophones are tested similarly, uniformity of the respective responses being the desideratum.

Because the applied pressure pulse is low-level, only the hydrophone under test "hears" the signal. The remaining hydrophones remain mechanically inert. However, since all of the hydrophones of any one group are electrically paralleled, they form a high impedance electrical loading effect on the output signal of the tested hydrophone. That loading, being constant for each group will not affect the relative responses of the individual hydrophones.

Tester 34 is shown as a fixed-coil, moving plunger device. It could equally well consist of a fixed permanent-magent core and an encircling moving coil. The upper portion of the coil is spring-suspended and an inelastic mallet is attached to the lower part of the coil for impacting the cable jacket.

The mechanical design of the device for creating the pressure pulse is not critical. One could modify the clapper of a door bell to serve the purpose. If a moving-coil device is preferred, a small, 8-ohm moving-coil radio speaker could readily be adapted. The essential requisites are that the generated pressure pulse be low-level and repeatable.

Figure 5:
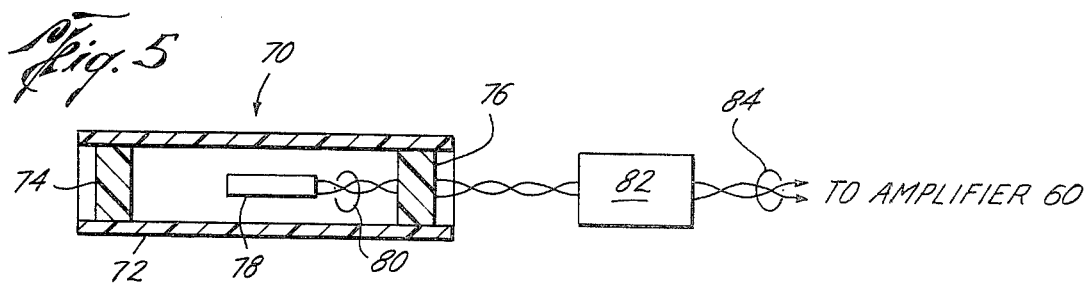
FIG. 5 shows construction details of a model of a marine cable.

As pointed out above, the gain of amplifier 60 is adjustable. The test set of this invention must be useable universally without regard to the particular design parameters of seismic streamer cables and hydrophones of competitive manufacture. The inherent response characteristics, particularly amplitude, of the products of different manufacturers are not necessarily similar. Accordingly, it is contemplated that a laboratory-standard model be made for any particular streamer cable to be field tested. Referring to FIG. 5, the model 70 consists of a short cylindrical jacket 72, one or two feet long. Closed at both ends by plugs 74 and 76, jacket 72 is filled with the same light-weight fluid as used in the streamer cable to be tested. A hydrophone 78 of the same type as used in the streamer cable is mounted in the oil filled jacket 72. A pair of leads 80 are coupled to hydrophone 78. A high-impedance load 82 to simulate the electrical load of an entire group of hydrophones, is connected to amplifier 60. Cable test set 34 is next applied to the model in the same manner as shown in FIG. 1. A series of pressure pulses are introduced into the fluid and the gain of amplifier 60 is adjusted to provide a convenient signal level and is fixed at that level for subsequent testing of the actual cable. The wave form from the laboratory test standard may be permanently recorded on oscillographic recorder 64 for future comparison with the results of the field tests of the corresponding streamer cable.

For analytical purposes, the recorded transient wave form from the laboratory standard may be subjected to a Fourier analysis or otherwise processed. The transient wave forms generated by the hydrophones under test may be recorded and analyzed similarly. The analytical results between the laboratory standard and the hydrophones under test may then be compared to obtain accurate quantitative results.

Although the method and equipment disclosed in this specification is primarily tailored for testing hydrophones in a finished streamer cable, I have found that the method is useful in productin testing of hydrophones before they are mounted inside the cable skin. In that embodiment, the hydrophones to be tested are placed upon a flat surface. The tester 34 is mounted on blocks with the mallet 46 positioned a fraction of an inch above the hydrophone case. The height of the mallet is sufficient so that the mallet will not actually touch the hydrophone when actuated. The force of the descending mallet is transmitted to the hydrophone through the air column between the mallet and the hydrophone.

I claim as my invention:

1. A method for in-situ testing the relative transient responses of individual hydrophones selected from a plurality of hydrophones mounted within a seismic streamer cable that consists of at least a sealed outer jacket containing a light-weight fluid and a plurality of electrical conductors for interconnecting the hydrophones into groups and for transmitting output signals from said groups, comprising the steps of:
    (a) introducing a low-lever reproducible pressure pulse in the fluid in the immediate vicinity of a first selected hydrophone to generate a first transient signal;
    (b) directly displaying said first transient signal;
    (c) measuring the polarity, amplitude and period of the displayed first transient signal;
    (d) introducing a substantially idential low-level pressure pulse in the fluid in the immediate vicinity of a second selected hydrophone to generate a second transient signal; and
    (e) directly displaying the second transient signal for comparison with the first transient signal.

2. The method as defined in claim 1 comprising the further steps of:
    repeating steps (d) and (e) for each remaining hydrophone of said plurality of hydrophones.

3. The method as defined in claim 1 or 2 wherein the step of introducing a low level pressure pulse comprises the step of:
    impacting the cable jacket in the immediate vicinity of a selected hydrophone with an inelastic mallet.

4. A method for testing the relative transient responses of individual hydrophones selected from a plurality of hydrophones that are electrically interconnected, the hydrophones being surrounded by a fluid, comprising the steps of:
    (a) introducing a low-level reproducible pressure pulse in the fluid in the immediate vicinity of a first selected hydrophone to generate a first transient signal;
    (b) displaying said first transient signal;
    (c) measuring the polarity, amplitude and period of the displayed first transient signal;
    (d) introducing a substantially identical low-level pressure pulse in the fluid in the immediate vicinity of a second selected hydrophone to generate a second transient signal; and
    (e) displaying the second transient signal for comparison with the first transient signal.

5. The method as defined in claim 4 comprising the further steps of:
    repeating steps (d) and (e) for each remaining hydrophone of said plurality of hydrophones.

* * * * *